United States Patent
Goldberg et al.

(12)
(10) Patent No.: US 6,298,125 B1
(45) Date of Patent: Oct. 2, 2001

(54) FREQUENCY-BASED DISCOUNT SYSTEM FOR HOST-SYSTEM WITHIN A COMMUNICATION NETWORK

(75) Inventors: Randy G. Goldberg, Holmdel; Amir M. Mane, Lincroft, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/219,354

(22) Filed: Dec. 23, 1998

(51) Int. Cl.[7] .................................................. H04M 15/00
(52) U.S. Cl. ...................... 379/114.1; 379/114.25; 379/114.12; 379/121.02; 379/121.04; 379/126
(58) Field of Search ................................ 379/112, 114, 379/144, 115, 114.03, 114.1, 114.12, 114.17, 114.25, 115.01, 115.02, 121.02, 121.04

(56) References Cited

U.S. PATENT DOCUMENTS

| | | | |
|---|---|---|---|
| 5,003,584 | * | 3/1991 | Benyacar et al. ............. 379/114 |
| 5,027,388 | * | 6/1991 | Bradshaw et al. ............ 379/112 |
| 5,276,444 | * | 1/1994 | McNair ........................ 379/114 |
| 5,608,785 | * | 3/1997 | Kasday ........................ 379/201 |
| 5,790,643 | * | 8/1998 | Gordon et al. ............... 379/114 |
| 5,793,852 | * | 8/1998 | Kang et al. .................. 379/115 |
| 5,799,072 | * | 8/1998 | Vulcan et al. ................ 379/114 |
| 5,844,972 | * | 12/1998 | Jagadish et al. ............. 379/114 |
| 5,864,610 | * | 1/1999 | Ronen .......................... 379/114 |
| 5,963,625 | * | 10/1999 | Kawecki et al. ............. 379/114 |
| 5,987,108 | * | 11/1999 | Jagadish et al. ............. 379/114 |
| 5,991,376 | * | 11/1999 | Hennessy et al. ........... 379/114 |
| 5,991,380 | * | 11/1999 | Bruno et al. ................. 379/115 |
| 6,052,447 | * | 4/2000 | Golden et al. ............... 379/114 |

* cited by examiner

*Primary Examiner*—Sinh Tran
*Assistant Examiner*—Rexford Barnie

(57) ABSTRACT

Method and apparatus provide a frequency discount for host payable calls provided by a communication network. Call information, including the customer's telephone number and the dialed telephone number, is processed to determine whether a particular call is eligible for the frequency discount. A host profile is retrieved from a memory based on the dialed telephone number from which the eligibility conditions of the discount are obtained. Customer records are retrieved from the same or different memory based on the customer telephone number. If the customer's history meets the conditions outlined by the host profile, the discount is awarded.

17 Claims, 2 Drawing Sheets

FREQUENCY-BASED DISCOUNT SYSTEM FOR HOST-SYSTEM WITHIN A COMMUNICATION NETWORK

BACKGROUND OF THE INVENTION

The present invention provides a billing system for communications networks that provides discounts for callers who exceed a host defined frequency of calls.

As is known, communication networks provide a medium for information exchange services. Under the known "1-900" service, for example, a customer dials a phone number associated with an information provider ("host company"). The customer incurs an access charge, called a "host charge," paid to the host company for release of desired information. The charges typically are per minute charges. For the purposes of this document, calls made under the 1-900 service or other services in which a host company earns revenue from a call are called "host payable calls."

Communication networks, such as the public switched telephone network, facilitate host payable calls. When a customer dials a telephone number identifying the host company, the communication network associates the telephone number with the host company's communication equipment and completes a call connection between the customer and the host's equipment. A communication switch within the network (the "billing switch") generates a billing record identifying administrative information relating to the call. The billing switch is one of the switches provided in a call path extending from the caller to the host. Typically, it is the first switch in the path, the one closest to the caller. For example the billing record may identify the customer's telephone number, the dialed telephone number, the time of the call, the time of day and the length of the call. Typically, the billing record is routed to a billing subsystem within the network.

The billing subsystem typically includes adjunct processors in communication with the switches and a router system that routes billing records from the adjunct processors to a rating system. The rating system includes two databases. A first database stores host profiles that identify, inter alia, the host charges that are assessed by the various host companies. The host profiles may identify host charges that are flat rates or per minute rates. A second database stores billing data of the various customers.

The billing subsystem examines the billing record to determine how to bill the call. The rating system determines that the call is a host payable call and refers the dialed number to the host database. It retrieves the associated host profile and identifies the host charge that should be charged to the customer. Responsive to the host charge information, the rating system calculates a charge against the customer. It writes the charge to the billing database.

The billing database is written with charges to be assessed against customers for all sorts of communication services, not only host payable calls but also collect calls, charge card calls and traditional long distance toll calls. A billing processor within the billing subsystem assembles the customer charges into traditional phone bills that customers receive.

The host charges of host payable calls are charged by the host company and earned by the host company. The host charges assessed against customers are credited to the host company. The rating system identifies a host credit earned by the host company and may write the credit to the host company's billing record in the billing database. In certain embodiments, the billing system may issue payments to host companies.

In addition to the host charge, the communication network typically assesses charges for the communication connection against the customer, against the host company or against both. The rating system also determines a connection charge to be assessed against the customer and/or host company and refers the connection charge to the billing system.

Host companies compete against each other for customers. One way they currently compete is through cost—host companies attempt to undercut each other in the host charges billed to the customers. Additionally, host companies would like to compete by encouraging customers to call into their respective services regularly and are inclined to offer discounts to "repeat callers" who do. Unfortunately, no known communication network provides a billing system that permits frequency discounts to be offered to customers.

Accordingly, there is a need in the art for a 1-900 type service that provides for frequency based discounts to customers that use the service.

SUMMARY OF THE INVENTION

The disadvantages of the prior art are alleviated by a method and apparatus that provides a frequency discount in communication systems providing host payable calls. Under the method, call information including the customer's telephone number and the dialed telephone number is processed to determine whether a particular call is eligible for the frequency discount. A host profile is retrieved based on the dialed telephone number from which the conditions of the discount are obtained. Customer records are retrieved based on the customer telephone number. If the customer records meet the conditions outlined by the host profile, the discount is awarded.

The customer's telephone number may be an identification of the telephone from which the customer is calling or may be a phone number entered by the customer.

DETAILED DESCRIPTION

Figure 1:
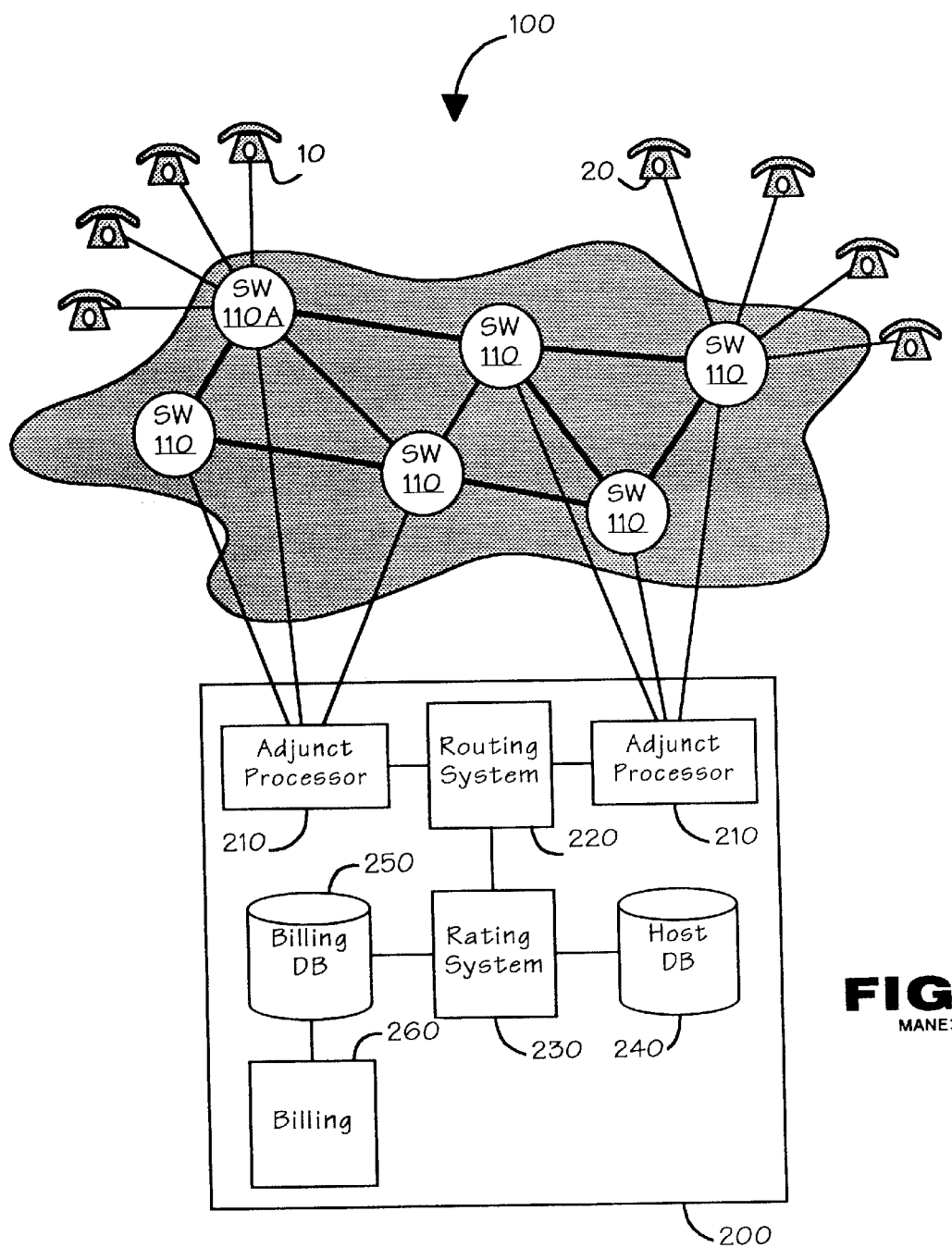
FIG. 1 is a block diagram of an embodiment of the present invention.

Turning to FIG. 1, there is shown a communication network 100 constructed in accordance with an embodiment of the present invention. The communication network 100 is populated by a plurality of communication switches 110. As is known, the communication network 100 carries call traffic, such as speech and data, from an originating party 10 to a terminating party 20. Each call traverses a call path through one or more communication switches 110 as it extends between the originating and terminating parties 10, 20. Typical communication switches 110 include the model 4ESS and model 5ESS switches commercially available from Lucent Technologies of Murray Hill, N.J.

The communication network 100 also includes a billing subsystem 200. The billing subsystem 200 includes one or more adjunct processors 210 in communication with the communication switches 110. The adjunct processors 210 receive billing records associated with telephone calls processed by the network 100. The adjunct processors 210 route all billing records to a routing system 220. The routing system 220, in turn, routes the billing records to a rating system 230.

The rating system 230 determines how much each call is worth. It is associated with two databases. The first database 240 is a profile database that contains a host profile associated with each host company. The second database is a billing database 250; it contains customer records awaiting processing by a billing processor 260.

Figure 2:
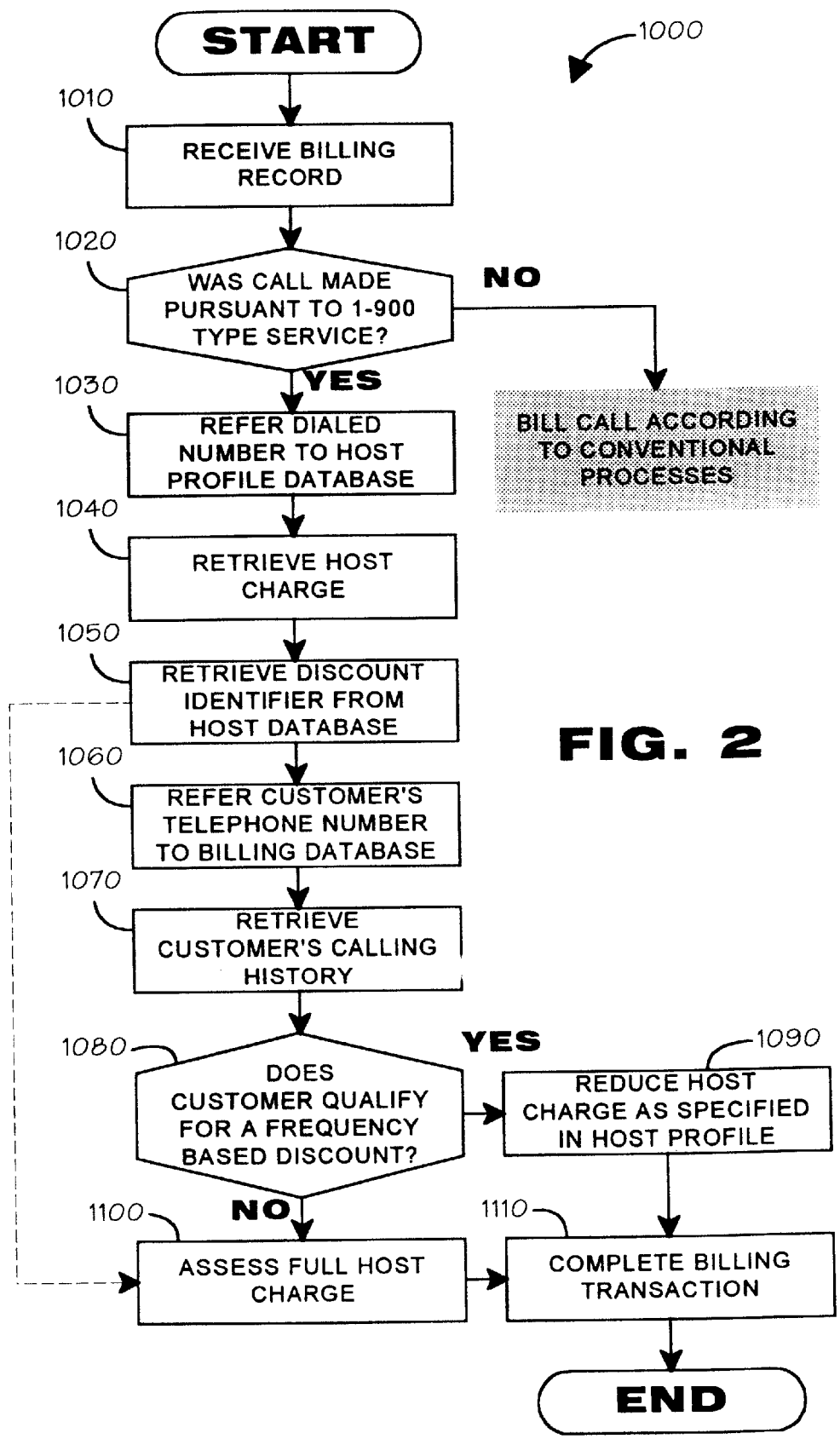
FIG. 2 is a flow diagram illustrating a method of operation according to an embodiment of the present invention.

To provide the desired frequency discounting billing, the rating system 230 may operate in accordance with the method 1000 of FIG. 2. There, the rating system 230 receives a billing record from the routing system 220 and determines whether the billing record identifies the call as a host payable call (Steps 1010 and 1020). If the call is a host payable call, the rating system 230 refers the dialed number to the host database 240 and retrieves a host charge established by the host company (Steps 1030 and 1040). The rating system 230 also retrieves a discount identifier from the host database 240 (Step 1050). As discussed below, the discount identifier establishes not only any discount that may be awarded to a qualifying customer but also terms under which a customer will qualify for a discount.

The rating system 230 refers the telephone number of the customer to a billing database 250 (Step 1060). Typically, the customer's telephone number is indicated by an automatic number identifier (also "ANI") as is conventionally known. However, it may be a customer ID entered by the customer as a part of call setup. The rating system 230 retrieves the customer's calling history from the billing database 250 (Step 1070) and scans the history to determine when the customer last called the host company, if at all. The rating system 230 determines whether the customer qualifies for the frequency based discount (Step 1080). If the customer's history indicates that the customer satisfied the parameters established by the host profile, the rating system 230 reduces the charge in an amount specified in the host profile (Step 1090). Otherwise, the rating system 230 assesses the full host charge against the customer (Step 1100). Thereafter, the rating system 230 concludes the billing transaction in accordance with known procedures (Step 1110).

If at step 1050, the host profile reveals that no frequency based discount is offered by the particular host company identified in the billing record, the rating system 230 may advance directly to step 1100 and then to step 1110.

As described, the host profile may identify discounts to be applied to qualifying customers as well as the terms under which the discount is to be applied. In a first embodiment, the profile provides a time indicator and a discount that identifies a time in which the customer must have called last to be eligible for the discount. Assume that one host profile identifies fourteen days in the time indicator. In response, the rating system 230 recalls the customer's calling history from the billing database only for the fourteen days preceding the time of the call in question. If the history identifies that the customer has called the host company within the time window, the discount may be awarded.

The time indicator may be parsed into a multiple number of time windows to provide a variable discount. A first time indicator and discount may provide for a first discount rate within a first time window (say, a 15% discount if the customer called within the past seven days). A second time indicator and discount may provide a second discount within a second time window (say, a 5% discount if the customer called within the fourteen day period preceding the seven day window).

In another embodiment, the host profile identifies a minimum number of calls that must have been placed under the service for a caller to be eligible for an award. Other alternatives may be envisioned consistent with the spirit of this disclosure.

Another embodiment of the present invention permits a customer to claim the benefit of the frequency discount when he calls from a phone other than the one the customer usually uses. In this embodiment, when the billing switch 110 determines that a customer is part of a host payable call, it monitors dialed information entered by the customer either during call setup or during the progress of the call itself. If done prior to the call connection, a predetermined dialing sequence may be interpreted by the billing switch to identify a telephone number from which the customer normally calls. If it detects the predetermined dialing sequence, the billing switch records a "home telephone number" entered by the customer in the billing record. If done during the call connection, the billing switch may monitor the call connection to detect the dialed sequence.

Responsive to the billing record, the rating system 230 operates in accordance with the method of FIG. 2. However, if it detects home telephone number information included in the billing record, the rating system 230 refers the home telephone number to the billing database 250 as the customer's telephone number. Thus, the rating system 230 may determine whether a customer qualifies for the host company's discount even if the customer calls from a non-traditional phone.

Accordingly, the present invention provides a method and apparatus that establishes a frequency discount feature for host payable calls. Call information, including the customer's telephone number and the dialed telephone number, is processed to determine whether a particular call is eligible for the frequency discount. A host profile is retrieved from a memory based on the dialed telephone number from which the eligibility conditions of the discount are obtained. Customer records are retrieved from the same or different memory based on the customer telephone number. If the customer's history meets the conditions outlined by the host profile, the discount is awarded.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method of awarding a frequency based discount to customers of a host payable communication service, comprising steps of:

receiving indicia of a host-payable call including a customer identifier and a destination identifier, retrieving a host profile based on the destination identifier, identifying a host charge and a discount identifier from the host profile, the discount identifier including a time indicator representing a time window in which the customer history must indicate the customer called the host payable communication service for the eligibility requirement to be met, said discount identifier further including a plurality of time indicators each associated with its own adjustment rate identifying eligibility requirements for a frequency based discount using the discount identifier, retrieving a customer history based on the customer identifier, and when the customer history meets the eligibility requirements, adjusting the host charge to be charged to the customer.

2. The method of claim 1, wherein the customer identifier is a home telephone number entered by the customer during the host-payable call.

3. The method of claim 1, wherein the customer identifier is an ANI of a customer.

4. The method of claim 1, wherein the customer identifier is a customer ID entered by the customer.

5. The method of claim 1, wherein, the discount identifier identifies a minimum number of host-payable calls that must have been placed by the customer to the host for the eligibility requirements to be met.

6. The method of claim 1, wherein the discount identifier identifies a minimum length that a previous host-payable call from the customer to the host must have extended for the eligibility requirements to be met.

7. The method of claim 1, wherein the indicia is contained in an automated billing record.

8. The method of claim 1, further comprising a step of, when a discount identifier is not provided in a host profile associated with the dialed telephone number, charging the host charge to the customer.

9. The method of claim 1, further comprising a step of charging the host charge to the customer when the eligibility requirements are not met.

10. A billing system for a communication network comprising:
   a rating system adapted to receive a billing record identifying a customer identifier and a destination identifier of a host-payable call made to a host company,
   retrieve a host profile from the first database based upon the destination identifier,
   identify a host charge and discount eligibility requirements as a discount identifier from the host profile, the discount identifier including a plurality of time indicators each associated with its own reduction rate,
   retrieve from the second database a customer record associated with the customer identifier,
   determine whether the calling history meets the discount eligibility requirements and, when the eligibility requirements are met, writes a charge to the customer record charging the customer a reduced host charge;
   a first database storing profiles of host companies, said profiles including charge rate adjustment parameters to host payable communication services; and
   a second database storing customer billing records.

11. The billing system of claim 10, wherein the customer identifier is a home telephone number entered by the customer during the host-payable call.

12. The billing system of claim 10, wherein the customer identifier is an ANI.

13. The billing system of claim 10, wherein the customer identifier is a customer ID entered by the customer.

14. The billing system of claim 10, wherein the discount identifier includes a time indicator representing a time window in which the customer history must indicate the customer called the host payable communication service for the eligibility requirements to be met.

15. The billing system of claim 10, wherein the discount identifier identifies a minimum number of host-payable calls that must have been placed by the customer to the host for the eligibility requirement to be met.

16. The billing system of claim 10, wherein the discount identifier identifies a minimum length a previous host-payable call from the customer to the host must have extended for the eligibility requirements to be met.

17. The billing system of claim 10, wherein the rating system writes a charge to the customer record charging the customer the full host charge.

* * * * *